United States Patent

[11] 3,560,801

[72] Inventor Colin S. McArthur
     Winston-Salem, N.C.
[21] Appl. No 707,021
[22] Filed Feb. 14, 1968
[45] Patented Feb. 2, 1971
[73] Assignee R. J. Reynolds Tobacco Company
     Winston-Salem, N.C.
     a corporation of New Jersey

[54] SYSTEM AND METHOD FOR ELECTRICALLY CONTROLLING A CHARACTERISTIC OF A MANUFACTURING FLOW PROCESS
9 Claims, 3 Drawing Figs.

[52] U.S. Cl. .................................................. 317/137,
     317/148.5; 250/83.3; 131/21; 330/69
[51] Int. Cl. ................................................. A24b 7/14,
     E01f 1/16; H03f 21/00
[50] Field of Search ................................. 317/123,
     134, 147; 250/83.3D; 235/151.1; 131/21, 21B,
     21D; 177/2.10 (Cursory); 340/15.5 (Inquired)

[56] References Cited
UNITED STATES PATENTS
2,650,332 8/1953 Bordewieck................. 317/137
3,089,497 5/1963 Molins et al. ................ 131/21

Primary Examiner—Lee T. Hix
Attorney—Lester W. Clark, P. E. Henninger, John A. Harvey, Gerald W. Griffin and Thomas F. Moran ABSTRACT: Apparatus and method for controlling a characteristic of a stream of moving material, specifically for controlling the density of a rod of cigarette stock, including means for measuring the characteristic at a predetermined point in the flow of the material, means for converting said measurement into an electrical input signal having an amplitude and a polarity respectively indicative of the magnitude and sense of deviation of the characteristic from a predetermined value, and means for controlling the characteristic located upstream from the deviation measuring means and controlled in response to the signal.

Means is provided for producing an anticipation signal concurrently with the actuation of the deviation-correcting control means and for introducing the anticipation signal into the control means in opposition to the effect of the input signal, so as to compensate for the timelag between the instant when a correction is made by the control means and the instant when the corrected stream of moving material reaches the deviation-measuring means. The anticipation signal increases in amplitude as a function of time. It is effective to stop operation of the control means before the measured characteristic has returned to its preselected value, and hence to prevent establishment of an oscillating or hunting condition of the control means.

INVENTOR.
COLIN S. MCARTHUR
BY Lester W. Clark
ATTORNEY

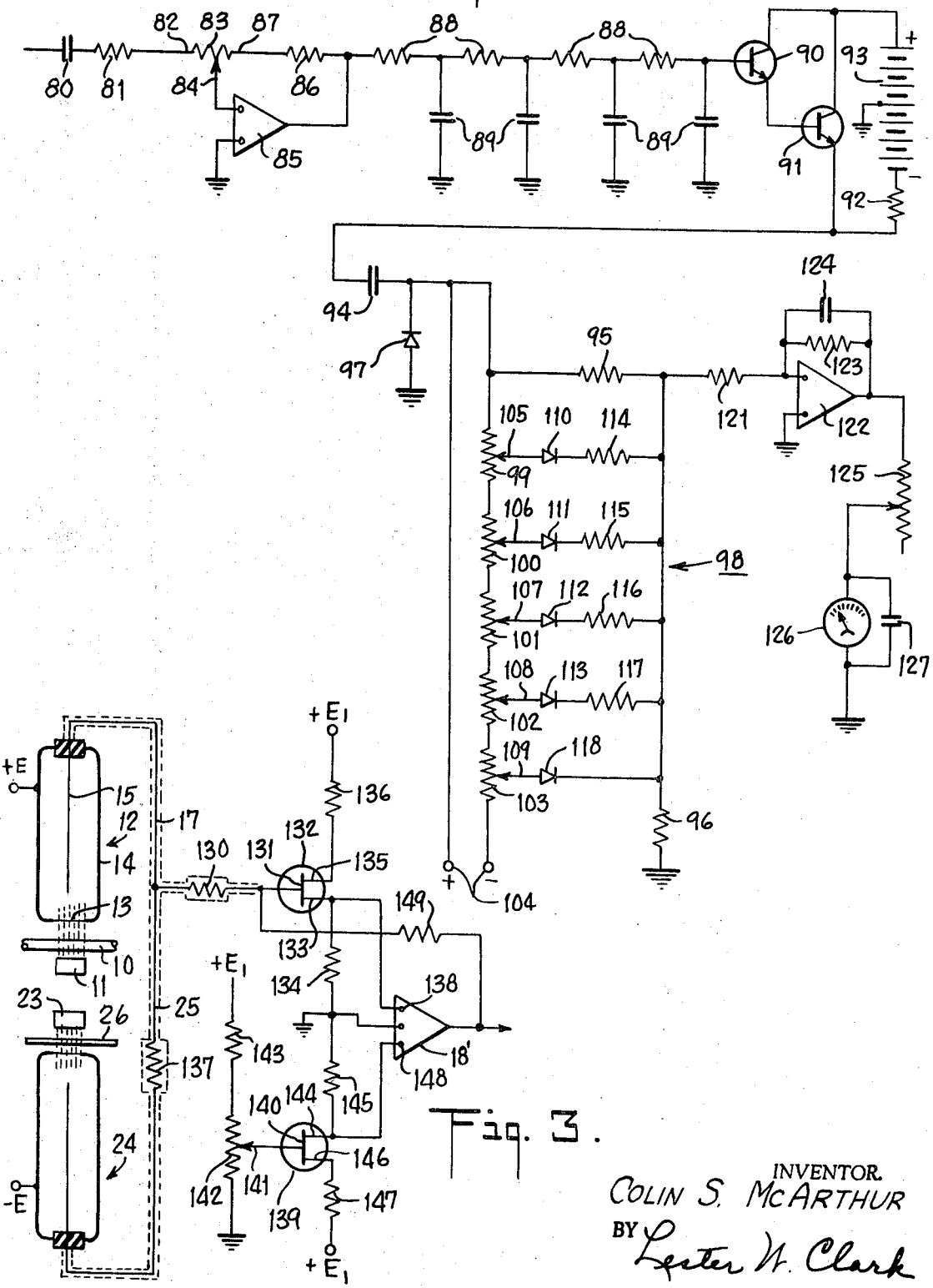

SYSTEM AND METHOD FOR ELECTRICALLY CONTROLLING A CHARACTERISTIC OF A MANUFACTURING FLOW PROCESS

The present invention relates to systems and methods for electrically controlling a characteristic of a manufacturing flow process, and while the system and method have utility in a wide range of diverse applications they have particular utility in automatic control of the incremental length density of a continuous rod of fabricated cigarette stock and will be described in that environment.

It is an object of the invention to provide a new and improved system and method for electrically controlling a characteristic of a manufacturing flow process and one which responds to the magnitude and sense of deviation of the flow-process characteristic from a preselected standard characteristic value to produce a flow-process control actuation which, having utility in correcting such deviation, is terminated prior to the time when the result of correction may be evidenced and in anticipation that such correction has been completed or will continue to completion.

It is a further object of the invention to provide an improved system for electrically controlling a characteristic of a manufacturing flow process and one which not only exhibits high operational sensitivity and stability over prolonged periods of unattended operation but requires only a minimum of service attention and maintenance.

It is an additional object of the invention to provide a system and method particularly suited electrically and automatically to control and maintain within close tolerances the incremental length density of a continuous rod of fabricated cigarette stock moving past a radiation-type density sensing gage prior to cutting of the rod into a succession of individual cigarettes of given uniform length.

Other and further objects and advantages of the invention will become apparent from the detailed description which follows when taken into conjunction with the accompanying drawings in which:

FIG. 2 is an electrical circuit of a standard deviation meter system which may be incorporated into the FIG. 1 control system if desired; and FIG. 3 is a circuit diagram representing a modified form of the FIG. 1 control system.

Figure 1:
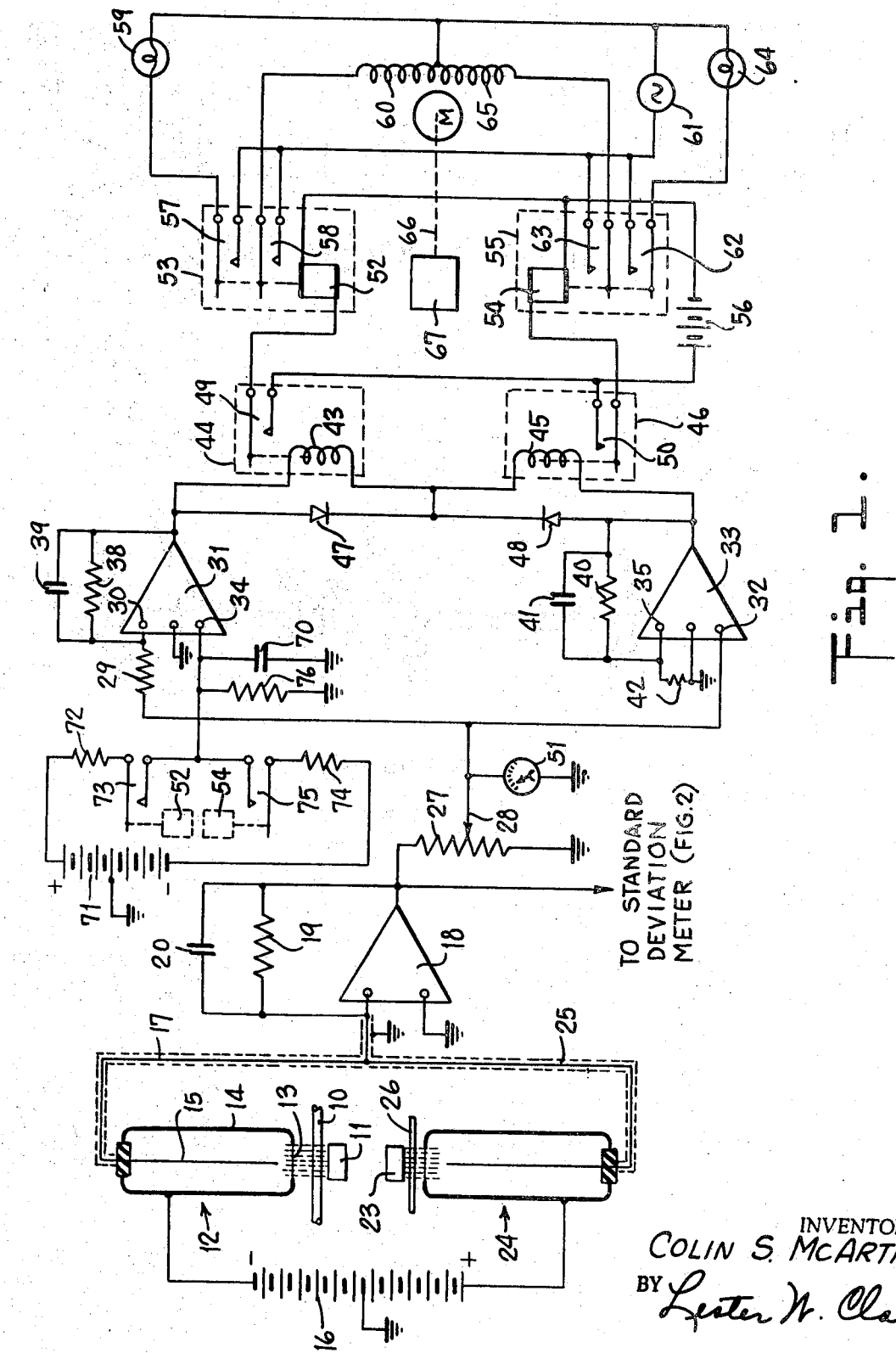
FIG. 1 is an electrical circuit diagram of an electrical control system embodying the invention in a form useful in the automatic fabrication of cigarettes.

Referring now more particularly to FIG. 1 of the drawings, the electrical circuit arrangement of a control system embodying the invention in a particular form is shown by way of example as utilized in cigarette manufacture to provide automatic control over the incremental length density of a continuous rod of cigarette stock 10 fabricated in conventional manner. The cigarette stock moves at constant velocity past a density scanning unit comprised by a radioactive source 11 of conventional radioactive material and a conventional ionization chamber device 12. The latter may be of the krypton gas-filled type, includes a thin metallic membrane window 13 hermetically closing one end of a cylindrical metal envelope 14 and admitting beta particles which emanate from the source 11 and are projected through the cigarette stock 10, and is provided with an interior electrode 15. A source of unidirectional potential, shown by way of example as comprised by a battery 16, has its negative terminal connected to the envelope 14 and has a center-tap grounded terminal which is connected to the electrode 15 through an electrical circuit comprised by a length of shielded coaxial cable 17 and the input-circuit resistance of a solid-state operational amplifier 18. The potential of the battery source 16 has a value selected to effect operation of the ionization chamber device 12 at the output plateau of its characteristic, and ions produced by beta particles emanating from the source 11 produce an external minute ion current which flows through the input-circuit resistance of the operational amplifier 18. The latter, being of the solid-state type, exhibits an input-circuit resistance of exceptionally high value of the order of $10^{12}$ ohms and has such a large value of unidirectional gain as to convert the minute input ion current to an output current in the milliampere range. The amplifier 18 is provided with a degenerative feedback circuit which includes a series resistor 19 having a value of resistance of the order of 100 megohms selected to provide a desired value of unidirectional current gain in the amplifier. A condenser 20 connected in shunt to the resistor 19 has a value of capacitance selected to provide substantially 100 percent degenerative back for higher frequencies to avoid high frequency feedback instability of the amplifier.

In providing automatic control over the incremental length density of the rod of cigarette stock 10, the system operates to maintain the density within close tolerances of a standard value of density. A measure of the latter is provided by a balance unit which includes a second radioactive source 23 of conventional radioactive material and a second conventional ionization chamber device 24 identical to the device 12. The device 24 is energized by the battery source 16 with such polarity as to produce through a length of shielded coaxial cable 25 and the resistive input circuit of the operational amplifier 18 a minute ion current of polarity opposite to that produced by the ionization chamber device 12. A beta particle absorptive material 26 is fixedly interposed between the radioactive source 23 and ionization chamber device 24 and is selected of such material and thickness as to cause a preselected standard density value of ion current flow through the resistive input circuit of the operational amplifier 18. Thus when the incremental length density of the rod of cigarette stock 10 has a preselected desired standard value, the resulting equal-valued and opposite polarity currents produced by the ionization chamber devices 12 and 24 cancel one another in the input circuit of the amplifier 18 and the latter under this condition produces no current flow through the resistive element of a potentiometer 27 included in the output circuit of the amplifier. Should the incremental length density of the rod of cigarette stock deviate above or below the desired standard density value, the resultant amplifier output current flowing through the resistive element of the potentiometer 27 produces across the latter a unidirectional signal potential of magnitude varying with the magnitude of deviation and of polarity varying with the sense of deviation above or below the standard density value.

By manual adjustment of a potentiometer slider 28, a proportionate part of the unidirectional signal potential developed across the potentiometer 27 may be selected and applied through an isolation resistor 29 to one input terminal 30 of a first solid-state differential operational amplifier 31 and to one input terminal 32 of a second solid-state differential operational amplifier 33. The amplifier 31 has a second input terminal 34 and, as is well known, translates electrical signals applied to its input circuits 30 and 34 through individual and separate operational amplifier signal translating channels to a common amplifier output terminal. One such signal translating channel, for example that coupled to the input circuit 30, inverts or reverses the polarity of the translated signal between the input terminal and the amplifier common output terminal while the other translating channel translates the signal without polarity inversion or reversal between its input terminal and the amplifier common output terminal. Thus signals translated through these channels are differentially combined in the common output terminal. In similar manner, the operational amplifier 33 has a second input terminal 35 and separate polarity inverting and noninverting signal translating channels coupling the input terminals 32 and 35 to a common amplifier output terminal. In the present control system, the signal applied to the input terminal 30 is translated through the polarity inverting signal translating channel of the amplifier 31 and the signal applied to the input terminal 32 is translated through the polarity noninverting signal translating channel of the amplifier 33.

The polarity inverting channel of the amplifier 31 has a degenerative feedback circuit which includes a series resistor 38 having a value of the order of 0.12 megohms to establish a desired value of channel gain. This feedback circuit further includes a condenser 39 connected in shunt to the resistor 38 and having a value of the order of 2 microfarads to provide substantially 100 percent degenerative feedback for all amplitude variations of the signal applied to the input circuit 30 which have a frequency of variation higher than that produced by the operation to be controlled. These higher frequency variations are thus eliminated from the control operation. The polarity inverting channel of the amplifier 33 likewise has a degenerative feedback circuit including a series gain-control resistor 40 and shunt-connected frequency-stabilizing condenser 41, of the same values as the resistor 38 and condenser 39, connected between the amplifier common output circuit and the input resistor 42 of the input circuit 35.

The common output terminal of the operational amplifier 31 is coupled in series with that of the operational amplifier 33 through an operating winding 43 of a sensitive relay 44 in series with an operating winding 45 of a sensitive relay 46. Diode rectifier devices 47 and 48 are connected with opposed conductive polarities across individual ones of the relay operating windings 43 and 45 as shown. By reason of the signal polarity inversion provided by the signal-translating channel coupled to the input circuit 30 of the operational amplifier 31 and the signal polarity noninversion of the signal-translating channel coupled to the input circuit 32 of the operational amplifier 33, the unidirectional input signal potential concurrently applied from the potentiometer 27 to the amplifiers 31 and 33 are additively or polarity-differentially combined in the series-coupled output circuits of the latter to provide a resultant unidirectional signal. This resultant signal has positive polarity at the output of the amplifier 33 and additive negative polarity at the output of the amplifier 31 when the input signal has positive polarity at the potentiometer 27 so that this polarity of the input signal renders the diode 48 conductive to energize the relay winding 43. The resultant signal conversely has positive polarity at the output of the amplifier 31 and additive negative polarity at the output of the amplifier 33 when the input signal has negative polarity, thus rendering the diode 47 conductive to energize the relay winding 45.

When the energizing current flowing through the relay winding 43 or the relay winding 45 exceeds a threshold value, its associated relay contacts 49 or 50 are operated to closed-contact position until the value of energizing current decreases slightly below the threshold value. The amplitude value of the unidirectional input signal from the output of amplifier 18 at which the contacts of either relay are so operated to closed-contact position is selected by manual adjustment of the potentiometer slider 28 as conveniently monitored by a meter 51. This adjustment establishes a preselected minimum value of deviation of the incremental length density of the cigarette stock 10, from the preselected standard value of density, at which density control actuation is to be initiated. Such control actuation is effected upon closure of the relay contacts 49 or 50 respectively to energize an operating winding 52 of a relay 53 or an operating winding 54 of a relay 55 from a unidirectional energizing source such as a battery 56. Energization of the relay winding 52 closes pairs of relay contacts 57 and 58 respectively to energize an indicating lamp 59 and one winding section 60 of a reversible motor M from an alternating current source 61, whereas energization of the relay winding 54 closes pairs of contacts 62 and 63 respectively to energize an indicating lamp 64 and a winding section 65 of the motor M from the source 61. The motor M thereupon rotates in one of two directions depending upon which of its winding sections 60 or 65 is energized, and is mechanically coupled as indicated by the broken line 66 to a conventional control structure 67 which may move a scalping knife on the tobacco stream approaching the rod forming mechanism or may control the speed of the tobacco feeder in either or both events providing density control in such sense and in such amount as to eliminate the deviation of the incremental length density of the cigarette stock 10 from the preselected standard value of density. Progressive correction of density deviation is evidenced by progressive reduction of amplitude of the unidirectional signal developed across the potentiometer 27, and complete correction is evidenced by reduction of the amplitude of this signal essentially to zero value with consequent deenergization of the relays 44 and 53 or 46 and 55.

The corrective control of cigarette stock density last described occurs at the rod-forming mechanism but is not sensed by the density-scanning ionization chamber device 12 until somewhat later depending upon the physical spacing of these structures and the linear velocity of movement of the cigarette stock 10. The present control system accordingly includes a control anticipatory means which operates to terminate the density correction prior to the time when the result of prevailing correction may be evidenced and in anticipation that such correction has been completed or will continue for a brief interval to completion. As explained above, the magnitude and polarity of the unidirectional signal translated from the input terminal 30 to the output terminal of the differential operational amplifier 31 is indicative of the extent and sense of deviation of the incremental length density of the cigarette stock 10 from the preselected standard of density. Further, the sense of such deviation results in energization of the relays 44 and 53 or 46 and 55 to actuate density correction by a selective direction of rotational energization of the motor M. In anticipation of completion of density correction, the control anticipatory arrangement of the present system produces across a condenser 70 and applies to the input terminal 34 of the amplifier 31 a unidirectional anticipation signal potential having the same polarity as the signal applied to the input terminal 30 of this amplifier and having an amplitude increasing with time. Since the translating channel which couples the input circuit 34 and the output circuit of the amplifier 31 is of the polarity noninverting type, the anticipation signal potential has opposing polarity to (and thus reduces the amplitude of) the resultant unidirectional signal produced in the series coupled output circuits of the amplifiers 31 and 33. As the anticipation signal increases in amplitude, it eventually reaches a value essentially equal to that of the resultant unidirectional signal and thereby terminates energization of the relays 44 and 53 or 46 and 55 to terminate the density deviation correction. It will be evident that larger density deviations have the benefit of longer deviation correction since a longer interval is required for the amplitude of the anticipation signal to attain that of the resultant unidirectional signal, and that smaller density deviations are corrected over smaller intervals for the same reason. After deviation correction is terminated, the anticipation signal amplitude rapidly decreases with time and either reaches zero value or again is developed with either positive or negative polarity upon initiation of a succeeding density deviation correction and according to the sense thereof.

The anticipation signal potential is developed across the condenser 70 by charge of the latter from a unidirectional potential source, such as a battery 71, through either of two charge circuits. The first of these charges the condenser 70 with positive polarity and includes a series resistor 72 and normally open contacts 73 provided in the relay 53 and which are operated to closed-contact position upon energization of its operating winding 52 to initiate a density deviation correction in one sense. The other charge circuit charges the condenser 70 with negative polarity and includes a series resistor 74 and normally open contacts 75 provided in the relay 55 and which are operated to closed-contact position upon energization of its operating winding 54 to initiate a density deviation correction in opposite sense. When neither of the relays 53 or 55 is energized, any charge remaining in the condenser 70 is discharged through a resistor 76 connected in shunt to the condenser. The charge time constant of the condenser 70 and resistor 72 or 74, typically having values of 50 microfarads and 0.1 megohm for the application herein described by way of example, may be selected to provide a control time proportional in a manner to optimize the control to a given analogue variation. The discharge time constant of the condenser 70 and resistor 76, typically 10,000 ohms, may be selected to match the transfer function or response characteristic of the machine or process being controlled. In the case of cigarette density control, these time constants provide time proportional control for the constant speed correction motors conventionally employed and in particular recognizes the time delay between the correction or corrective control (as by moving a scalping knife) and the sensing of this correction by the scanning ion chamber device 12, thereby to anticipate the correction and prevent overcorrection or corrective overshoot.

FIG. 2 shows the electrical circuit diagram of a standard deviation meter which may be used with the FIG. 1 control system to monitor the prevailing magnitude of deviation of a manufacturing flow-process characteristic from a preselected characteristic value. When used with the FIG. 1 system, the meter measures the magnitude of prevailing deviations of the incremental length density of the cigarette stock 10 from a preselected standard value of density. The meter is connected to the output terminal of the operational amplifier 18 as indicated in FIG. 1. It includes a series input condenser 80 which selects the prevailing alternating current components of the deviation signal translated by the amplifier 18 and applies these components through an isolating series resistor 81 to one terminal 82 of the resistive element 83 of a potentiometer having a slider 84 connected to the input circuit of an operational amplifier 85. The latter includes a degenerative feedback circuit coupling its output and input circuits through a series resistor 86 and through that portion of the potentiometer 83 between its slider 84 and its terminal 87, thus enabling adjustment of the gain of the amplifier 85 by manual adjustment of the slider 84.

The alternating current signal translated by the amplifier 85 is applied to a conventional low-pass RC filter, comprised by a plurality of series-connected resistors 88 and shunt-connected condensers 89, which filters undesired higher frequency components of the signal and applies the filtered alternating current signal to a conventional direct-connected and tandem-arranged dual-stage emitter-follower amplifier comprised by NPN transistors 90 and 91 having an emitter output load resistor 92. These transistors are energized by a unidirectional energizing source such as a battery 93 and provide an alternating signal drive source of low source impedance matched to the input impedance of a conventional signal clamper and signal-amplitude squarer which are connected across the load resistor 92. The signal clamper is comprised by a series-connected condenser 94, by series-connected potential-divider resistors 95 and 96, and by a diode rectifier 97 connected with the conductive polarity shown across the resistors 95 and 96. The signal-amplitude squarer 98 is connected across the resistor 95 and is of the so-called diode string squarer type. It is comprised by a plurality of potentiometers 99—103 having their resistive elements connected in series across a source of amplitude-regulated unidirectional potential which is connected to a pair of energizing terminals 104 and is effective to produce a relatively constant-amplitude potential drop across each potentiometer. The potentiometers 99—103 have respective sliders 105—109, the sliders 105—108 being connected to the juncture of the resistors 95 and 96 through respective diode rectifier devices 110—113 and respective resistors 114—117. The potentiometer slider 109 is connected to such juncture only through a diode rectifier device 118. The negative-peak clamped alternating signal translated by the clamper condenser 94 is applied to the potential divider resistors 95 and 96. The diode string squarer 98 operates to shunt the voltage divider resistor 95 with a value of shunt resistance which is reduced or increased as increasing or decreasing step-valued amplitudes of the clamped alternating signal cause the diode rectifiers 110—113 and 118 to become successively conductive in order from the rectifier 110 to the rectifier 118 or successively nonconductive in reverse order. The potentiometer sliders 105—109 of the squarer are manually so adjusted in relation to the values of the associated resistors 114—117 that the resultant potential division provided by the shunted value of resistance of the resistor 95 and the resistor 96 varies according to a square-law characteristic. Thus the signal developed across the resistor 96 has an amplitude varying with the square of the signal amplitude applied to the resistors 95 and 96 in series.

This squared signal is applied through a series resistor 121 to an operational amplifier 122 having a degenerative feedback network coupling its output and input circuits and comprised by a resistor 123 and shunt-connected condenser 124. The values of the components 123 and 124 are selected in conventional manner such that the amplifier 122 provides low frequency summation or integration of the amplitude-squared alternating signal applied to its input circuit. The resultant summation signal is supplied through a variable resistor 125 to a meter 126 which may be of the indicating or recording type and which is shunted by a condenser 127 of relatively large value of the order of 500 microfarads The meter 126 has its indicia scale calibrated to read the square root of the amplitude of the summation signal in the output circuit of the amplifier 122. The variable resistor 125 is manually adjustable to provide adjustment of the full scale reading of the meter 126, and the condenser 127 provides further integration or summation of the amplitude-squared alternating signal applied to the amplifier 122 and prevents the indicating or recording needle of the meter 126 from following minute changes of output current of the amplifier. The meter 126 provides measurements of "running" standard deviations of the input signal applied to the FIG. 2 indicating system.

FIG. 3 is a circuit diagram of a portion of the FIG. 1 control system and represents a modified form of the latter. Components in FIG. 3 which correspond to the same components of FIG. 1 are identified by the same reference numerals primed. In the present arrangement, the ion current produced by the scanning ion chamber device 12 is supplied through a resistor 130 to a high-input-impedance gate electrode 131 of a field-effect transistor 132. The latter has a source electrode 133 connected to ground through a resistor 134, and has a drain electrode 135 connected to the positive terminal of a unidirectional energizing source $+E_1$ through a resistor 136. The oppositely polarized ion current produced by the balance ion chamber device 24 is supplied through a resistor 137 and the resistor 130 to the high-input-impedance gate electrode 131 of the transistor 132. As is well known, the gate electrode 131 of the transistor 132 presents a very high input impedance to these two applied minute ion currents of opposite polarities. These currents combine to produce a resultant gate current which develops across the resistor 134, providing a relatively lower impedance output circuit for the transistor 132, a resultant unidirectional signal having a mean unidirectional amplitude when the ion currents of the devices 12 and 24 are equal and having larger or smaller amplitude value according to which of these currents is the larger. This signal is applied to one input terminal 138 of a differential operational amplifier 18' which may conveniently be of the vacuum tube type having relatively lower input circuit resistance preferably matching the output circuit impedance of the transistor 132. A second field effect transistor 139 has a gate electrode 140 connected to a manually adjustable slider 141 of a potentiometer 142 energized through a resistor 143 from the potential source $+E_1$, has a source electrode 144 connected to ground through a resistor 145, and has a drain electrode 146 connected through a resistor 147 to the potential source $+E_1$.

The slider 141 of the potentiometer 142 is manually adjusted to supply a value of unidirectional bias current to the gate electrode 140 such as to develop across the resistor 145 a unidirectional potential equal in amplitude to the mean amplitude of the unidirectional resultant signal developed across the resistor 135 by the transistor 132. This unidirectional potential has the same polarity as the resultant signal and is supplied to a second input terminal 148 of the differential amplifier 18'. The latter has an output circuit in which the resultant signal applied to the input terminal 138 is differentially combined with the unidirectional potential applied to the input terminal 148. The differential output circuit unidirectional signal accordingly has zero value when the ion currents of the devices 12 and 24 are equal, but has an amplitude varying with the differential amplitude of these ion currents and either positive or negative polarity according to which of the ion currents is the larger. The operational characteristics of the amplifier 18' and the transistor 132 are stabilized by a degenerative feedback circuit comprised by a resistor 149 which couples the output circuit of the amplifier 18' to the gate electrode 131 of the transistor 132. The amplifier 18' replaces the amplifier 18 of the FIG. 1 control system, and its output signal accordingly is supplied to the potentiometer 27 of the FIG. 1 control system and to the standard deviation meter of FIG. 2 to provide deviation control and deviation indication in the manners previously described.

It will be apparent from the foregoing description of the invention that a control system or method embodying the invention responds to the magnitude and sense of deviation of a flow-process characteristic from a preselected standard characteristic value to produce a flow-process control actuation which has utility in correcting such deviation but is terminated prior to the time when the result of correction may be attained and in anticipation that such correction has been completed or will continue to completion. The system of the invention has the further advantage that it exhibits high operational sensitivity and stability over prolonged periods of unattended operation and requires only a minimum of service attention and maintenance. The system and method of the invention have particular utility in electrically and automatically controlling, to maintain within close tolerances, the incremental length density of a continuous rod of fabricated cigarette stock moving past a radiation-type density sensing gauge prior to cutting of the rod into a succession of individual cigarettes of given uniform length.

While there have been described herein differing forms of the invention for purposes of illustration, it is contemplated that numerous changes may be made without departing from the spirit of the invention.

I claim:

1. Apparatus for controlling a characteristic of a stream of flowing material, comprising:
   a. means responsive to said characteristic for producing an electrical input signal having an amplitude and a polarity respectively indicative of the magnitude and sense of deviation of said characteristic from a preselected value;
   b. control means responsive to said signal and located upstream of said signal-producing means, said control means being effective to produce a deviation-reducing change in said characteristic in response to a signal of an amplitude exceeding a preselected threshold value; and
   c. anticipation means operated concurrently with said control means and effective to produce an anticipation signal acting on said control means in opposition to said input signal and thereby effective to terminate operation of said control means before said input signal falls below said threshold value.

2. Apparatus as defined in claim 1, wherein said anticipation means produces an anticipation signal of amplitude increasing with time and having a polarity opposite to that of said input signal.

3. Apparatus as defined in claim 2, wherein said anticipation means comprises:
   a. a capacitor having a charging circuit including a series-connected resistor and a discharge circuit including a shunt-connected resistor; and
   b. means operated concurrently with said control means for impressing across said charging circuit a potential of fixed amplitude and of polarity determined by the sense of actuation of said control means, the potential across said capacitor acting as said anticipation signal.

4. Apparatus as defined in claim 3, wherein said control means comprises:
   a. a pair of electrical relays;
   b. means for selectively energizing said relays to cause selective operation of the control means in one of two opposite senses; and
   c. said anticipation produces an anticipation signal of a polarity dependent on the particular relay energized.

5. Apparatus according to claim 3, including:
   a. filter means for deriving from said input signal an alternating current signal of limited frequency bandwidth;
   b. means for squaring the instantaneous amplitude of said alternating current signal;
   c. means for integrating the squared signal; and
   d. means for indicating the integrated value of the translated signal.

6. Apparatus for electrically controlling the density of a moving rod of cigarette stock, comprising:
   a. means responsive to the density of said rod at a fixed locality for producing an electrical input signal having an amplitude and polarity respectively indicative of the magnitude and sense of deviation of the density from a preselected value;
   b. control means responsive to said signal and located upstream of said signal-producing means, said control means being effective to produce a deviation-reducing change in said rod density in response to a signal of an amplitude exceeding a preselected threshold value; and
   c. anticipation means operated concurrently with said control means and effective to produce an anticipation signal acting on said control means in opposition to said input signal and thereby effective to terminate operation of said control means before said input signal falls below said threshold value.

7. A method for controlling a characteristic of a stream of flowing material, which comprises:
   a. producing an electrical input signal having an amplitude and polarity respectively indicative of the magnitude and sense of deviation of said characteristic from a preselected value, as measured at a fixed locality along said stream;
   b. varying said characteristic at a second locality upstream from said fixed locality, whenever said signal amplitude exceeds a preselected threshold value, and in a sense determined by the polarity of the signal, so as to reduce the deviation causing said signal;
   c. producing an anticipation signal concurrently with the variation of said characteristic and having a polarity dependent upon the direction of said variation; and
   d. utilizing said anticipation signal to oppose the effect of said input signal.

8. The method of claim 7, including the further step of increasing the amplitude of said anticipation signal as a function of time.

9. A method for controlling the density of a moving rod of cigarette stock, which comprises:
   a. producing an electrical input signal having an amplitude and a polarity respectively indicative of the magnitude and sense of deviation of said density from a preselected value, as measured at a fixed locality along said rod;
   b. varying said characteristic at a second locality upstream from said fixed locality, whenever said signal amplitude exceeds a preselected threshold value, and in a sense determined by the polarity of the signal, so as to reduce the deviation causing said signal;
   c. producing an anticipation signal concurrently with the variation of said characteristic and having a polarity dependent upon the direction of said variation; and
   d. utilizing said anticipation signal to oppose the effect of said input signal.